Oct. 22, 1968  R. E. HARDER  3,406,947
INTERFACIAL SURFACE GENERATOR
Filed Aug. 19, 1966  2 Sheets-Sheet 1

INVENTOR.
Richard E. Harder
BY
AGENT

INVENTOR.
Richard E. Harder
BY
AGENT

# United States Patent Office 3,406,947
Patented Oct. 22, 1968

3,406,947
INTERFACIAL SURFACE GENERATOR
Richard E. Harder, Williamsburg, Va., assignor to The Dow Chemical Company, Midland, Mich., a corporation of Delaware
Filed Aug. 19, 1966, Ser. No. 573,685
8 Claims. (Cl. 259—4)

ABSTRACT OF THE DISCLOSURE

Mixing baffles are placed in a pipe or tube and provide a mixing action for fluent material generally independent of throughput when flow is maintained below the turbulent range. The particular variety of baffles used are characterized in that a tendency to orient or rotate the stream is eliminated.

---

Figure 1:
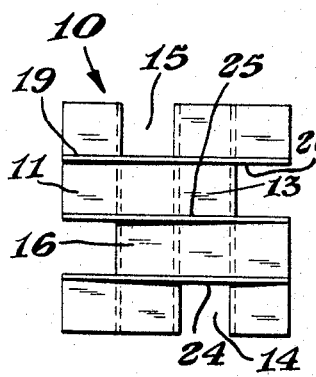

This invention relates to an improved interfacial surface generator, and more particularly relates to an improved interfacial surface generator and an improved method of dividing and recombining streams with an interfacial surface generator.

In U.S. Letters Patent 3,195,865 is disclosed an interfacial surface generator having four passages or channels which serve to divide and recombine a stream and provide a plurality of layers therein. A preferred embodiment of the interfacial surface generator set forth in U.S. 3,195,865 is the four channel embodiment typified in FIGURES 1–10. The baffles of FIGURES 1–10 are right handed or left handed, that is, baffles tend to impart an orientation to the stream, and oftentimes it is desired to employ both right and left handed baffles in order to have satisfactory or symmetrical mixing or layering of the stream. Thus, if such baffles are prepared by casting or machining, it is oftentimes desired to provide two different baffles, that is, a "right handed" baffle and a "left handed" baffle.

It would be desirable if there were available an interfacial surface generator having a baffle without the characteristics of "handedness."

These benefits and other advantages in accordance with the present invention are achieved in a baffle for an interfacial surface generator, the baffle adapted to be disposed in a conduit to divide and recombine a flowing mass; the baffle comprising a body having a first end and a second end; the body defining four channels communicating with the first and second ends and having stream dividing means at the ends; each of the channels having a first opening and a second opening; each of the openings having a generally elongated cross-sectional configuration in a plane normal to the longitudinal axis of the conduit; the major axes of the generally elongated cross-sectional configuration of the first and the second openings being non-coplanar; the channels being so constructed and arranged that rotation of the flow lamina of the stream is less than the angular displacement between the stream dividing means at the first end and the stream dividing means at the second end, by the improvement which comprises arranging the channels in such a manner that the baffle when viewed from either end has a swastika-like configuration, the swastika-like configuration being of opposite hand when viewed from opposite ends; the swastika-like configuration being obtained when the stream dividers at the first end are positioned in a horizontal plane and the four channels from top to bottom in an end view of the baffle are numbered 1, 2, 3 and 4 and the channels appear at the second end of the baffle in the order 2, 4, 1, 3.

The method of the present invention comprises in a method comprising generating internal surfaces within a flowing mass within a conduit without significantly rotating the flow lamina of said mass, the steps of the method comprising dividing the flowing mass into four parts by dividing means; decreasing the cross-sectional dimension of said parts in the plane of said dividing means; increasing the dimension of said parts in a plane non-coplanar with the plane of said dividing means, and recombining said parts in overlapping relationship wherein the more centrally located parts are disposed toward the periphery of the conduit, and the peripheral parts are positioned more centrally, the improvement which comprises dividing the main stream into first, second, third and fourth streams, the first, second, third and fourth streams being initially in numerical order and recombining the streams in the order of second, fourth, first and third.

Figure 2:
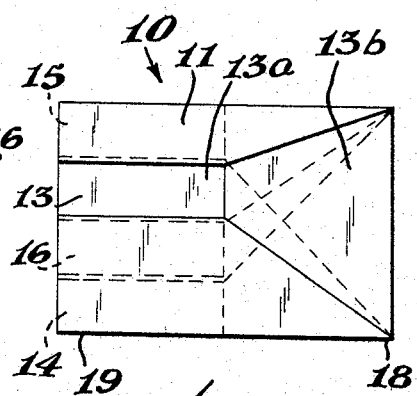
Figure 3:
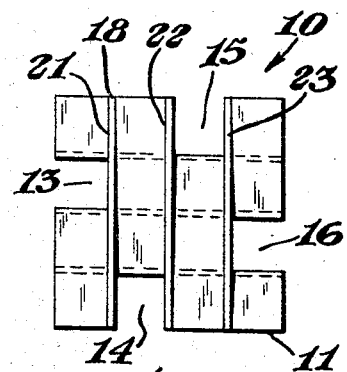
Figure 4:
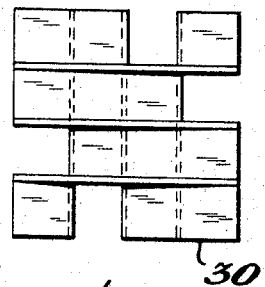
Figure 5:
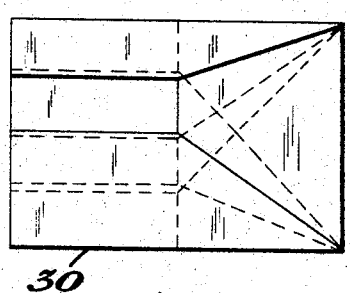
Figure 6:
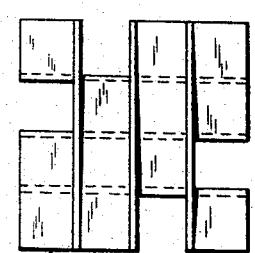
Figure 7:
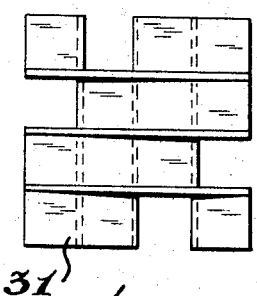
Figure 8:
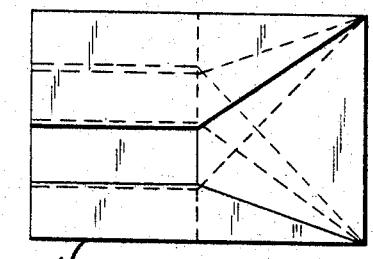
Figure 9:
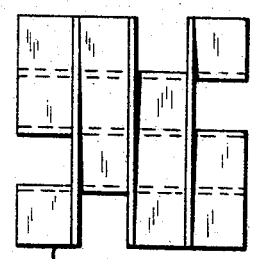
Figure 11:
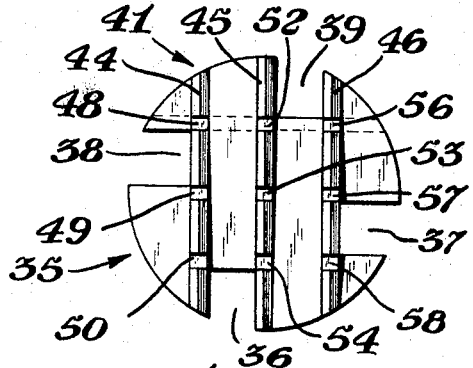
Figure 10:
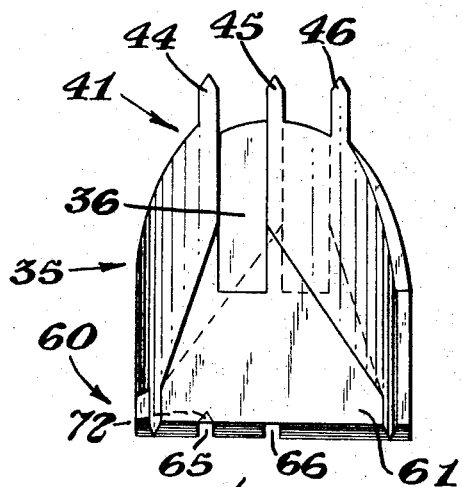
Figure 13:
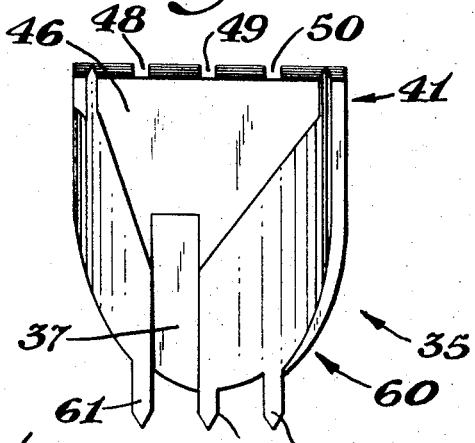
Figure 14:
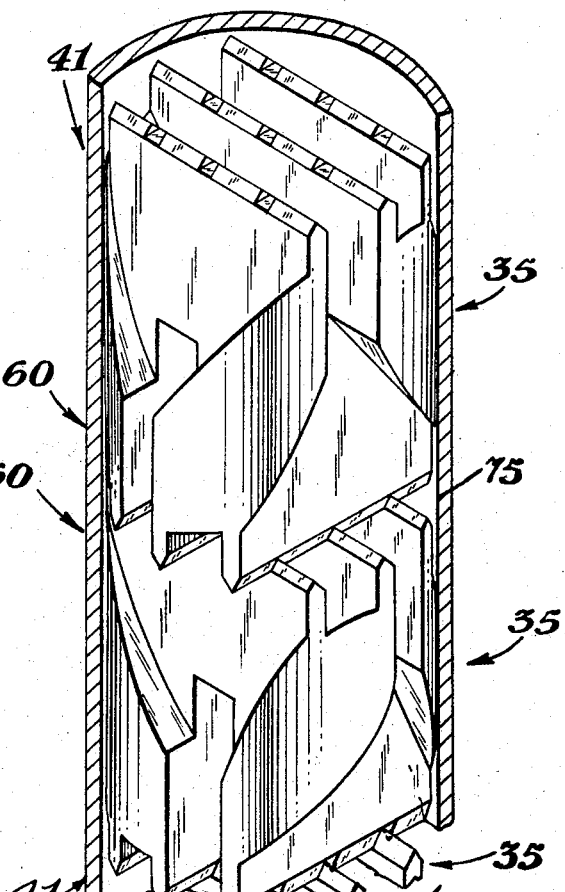
Figure 12:
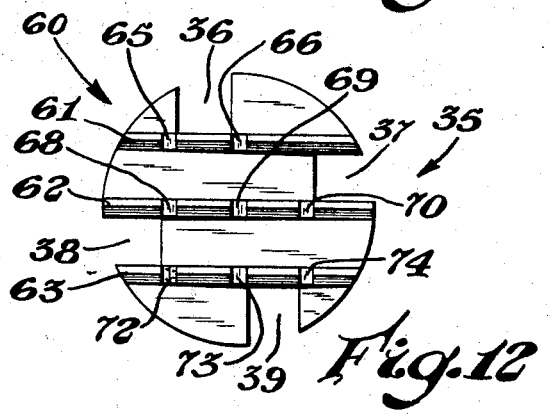

Further features and advantages of the present invention will become more apparent from the following specification when taken in connection with the drawing wherein:

FIGURES 1, 2 and 3 show end and side views of a baffle in accordance with the invention.
FIGURES 4, 5 and 6 show views of what is arbitrarily considered to be a right handed baffle.
FIGURES 7–9 are three views of a left handed baffle.
FIGURES 10, 11, 12 and 13 show four views of a baffle in accordance with the present invention for a circular conduit.
FIGURE 14 depicts three baffles of FIGURES 10–13 in operative end to end engagement disposed in a conduit.

In FIGURES 1, 2 and 3 are depicted three views of a baffle in accordance with the present invention generally designated by the reference numeral 10. The baffle 10 comprises a body 11. The body 11 has defined therein four channels 13, 14, 15 and 16. The channels are formed by the body and have a generally T-shaped configuration. The body 11 has a first end 18 and a second end 19. The first end 18 of the body 11 has stream dividing means 21, 22 and 23. The second end of the body has stream dividing means 24, 25 and 26. The passages or channels 13, 14, 15 and 16 when viewed from an end view have a generally T-shaped configuration and from a side view of the configuration shown in FIGURE 2 designated by the reference numeral 13, that is, the channel has a parallel portion 13a and a diverging portion 13b. Rotation of the channel 13 by 90° provides a configuration which is a mirror image of the configuration shown in FIGURE 2. All of the channels have this configuration.

In operation of the baffle in accordance with the present invention, if one considers the channels 13, 14, 15 and 16 to represent stream portions 1, 2, 3 and 4, respectively, and that the first end 18 of the baffle can be considered as the upstream end. A stream is divided into four separate parallel substreams and discharged from the second end 19 of the baffle with the substreams reoriented and repositioned in the order of 2, 4, 1, 3. The baffle of FIGURES 1, 2 and 3 when viewed from the end portions has a generally swastika-like configuration which is of opposite hand when the baffle are reversed. Employing a baffle of the variety shown in FIGURES 1, 2 and 3, it is unnecessary to provide alternately left handed and right handed baffles.

For ease of comparison, FIGURES 4, 5 and 6 show a baffle 30 which is arbitrarily designated as a right handed baffle.

FIGURES 7, 8 and 9 show three views of a baffle 31 which is arbitrarily considered to be a left handed baffle.

Baffles of the present invention provide a substantial advantage in that either a shorter baffle may be prepared or a lower pressure drop is obtained. Employing the baffle of the present invention with the same slope, that is angle, in the passages, a shorter baffle may be obtained. If the same length of baffle is used, the smaller slope and consequent lower pressure drop results. By the term "slope" is meant the included angle within the diverging and converging or tapering portions of the passageways.

Baffles in accordance with the present invention are assembled in such a manner that the first ends of adjacent baffles are adjacent and the adjacent stream dividing means of adjacent baffles are disposed at 90° to each other. Thus, when a pulrality of baffles in accordance with the invention such as are depicted in FIGURES 1, 2 and 3 are assembled within a conduit, the first and second baffles have first ends adjacent; the second and third baffles have second ends adjacent; the third and fourth baffles have first ends adjacent; etc., until the desired number of baffles have been positioned within the conduit. Such an arrangement eliminates the "handedness" present in the baffles of FIGURES 4–9.

FIGURES 10, 11, 12 and 13 show four views of alternate baffles in acordance with the present invention generally designated by the reference numeral 35. The baffle 35 has defined therein four channels 36, 37, 38 and 39. The baffle 35 has a first end 41 and a second end 60. The first end 41 has three stream dividers 44, 45 and 46. The stream divider 44 defines three indexing notches 48, 49 and 50. The second stream dividing means defines three indexing notches 52, 53 and 54. The third stream dividing means 46 defines three indexing notches 56, 57 and 58. The baffle 35 has a second end 60. The second end 60 has first, second and third stream dividing means 61, 62 and 63. The first stream dividing means 61 defines first and second indexing notches 65 and 66. The second streams dividing means 62 defines three indexing notches 68, 69 and 70. The third indexing means defines three indexing notches 72, 73 and 74. The indexing notch 74 is deeper than the remaining indexing notches and is adapted to receive the un-notched portion of the stream divider 61.

Thus, employing this configuration, the first ends and second ends of the baffle are readily recognized and pre-assembly is readily accomplished with assured indexing. As is obvious to those skilled in the art, any indexing means which permits either the distinguishing of the first end from the second end or assembly of the baffles in such a manner that they are assembled first end to first end and second end to second end with the desired perpendicular arrangement between adjacent stream dividing means, readily accomplishes the desired purpose.

FIGURE 14 depicts a plurality of baffles 35 in assembled relationship disposed within a conduit 75.

The configuration of the baffle as depicted in FIGURES 11–14 is such that if an interference or forced fit is employed for the indexing notches, the baffles may be assembled externally and frictionally held together external to the conduit and a number introduced at one time.

Assembly of baffles such as the baffles 35 of FIGURES 10–14 when examined in color mixing of viscous liquid in a glass conduit exhibit excellent mixing characteristics and are substantially superior to previously known arrangements.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:
1. In a baffle for an interfacial surface generator, the baffle adapted to be disposed in a conduit to divide and recombine a flowing mass, the baffle comprising a body having a first end and a second end, the body defining four channels communicating with the first and second ends and having stream dividing means in the ends, each of the channels having a first opening and a second opening, each of the openings having a generally elongated cross-sectional configuration in a plane normal to the longitudinal axis of the conduit, the major axes of the generally elongated cross-sectional configuration of the first and second openings being non-coplanar, the channels being so constructed and arranged that rotation of the flow lamina of the stream is less than the angular displacement between the stream dividing means at the first end and the stream dividing means at the second end, the improvement which comprises arranging the channels in such a manner that the baffle when viewed from either end has a swastika-like configuration, the swastika-like configuration being of opposite hand when viewed from opposite ends, the swastika-like configuration being obtained when the stream dividers at the first end are positioned in a horizontal plane and the four channels thereis from top to bottom in an end view of the baffle are numbered 1, 2, 3 and 4 and the channels appear at the second end of the baffle in the order of 2, 4, 1, 3.

2. The baffle of claim 1 wherein the baffle has a generally circular configuration in a plane normal to the longitudinal axis of the conduit.

3. The baffle of claim 1 wherein the first end of the body defines a first indexing means, and the second end of the body defines a second indexing means, both of which indexing means are adapted to cooperate with a like baffle and maintain a fixed radial relationship between like ends of adjacent baffles.

4. The baffle of claim 3 wherein the indexing means of the baffles are a plurality of notches in the stream dividing means.

5. A plurality of baffles in accordance with claim 1 arranged in end to end relationship and disposed within a conduit.

6. The baffles of claim 5 wherein adjacent stream dividing means on adjacent baffles are disposed at substantially right angles.

7. The baffles of claim 6 wherein the stream dividing means of the first and second ends of each of the baffles are disposed substantially at right angles.

8. In a method for generating an internal surface within a flowing mass within a conduit without significantly rotating the flow lamina of the mass, the steps of the method comprising dividing the mass into four parts by dividing means,
decreasing the cross-sectional dimension of the parts in the plane of the dividing means,
increasing the dimension of the parts in a plane non-coplanar with the plane of the dividing means, and
recombining the parts in overlapping relationship wherein the more centrally located parts are disposed toward the periphery of the conduit and the peripheral parts are positioned more central.
the improvement which comprises dividing the main stream into first, second, third and fourth streams, the first, second, third and fourth streams being initially in numerical order, and recombining the streams in the order of second, fourth, first and third.

References Cited
UNITED STATES PATENTS

| | | | |
|---|---|---|---|
| 3,051,452 | 8/1962 | Nobel | 259—4 |
| 3,051,453 | 8/1962 | Sluijters | 259—4 |
| 3,195,865 | 7/1965 | Harder | 259—4 |

WALTER A. SCHEEL, *Primary Examiner.*
J. M. BELL, *Assistant Examiner.*